United States Patent
Grylls et al.

(10) Patent No.: US 6,667,114 B2
(45) Date of Patent: Dec. 23, 2003

(54) TURBINE AIRFOILS HAVING MODIFYING STOICHIOMETRIC NIAL COATINGS APPLIED BY THERMAL PROCESSES

(75) Inventors: Richard J. Grylls, Cincinnati, OH (US); Yuk-Chiu Lau, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/138,448

(22) Filed: May 3, 2002

(65) Prior Publication Data

US 2002/0192496 A1 Dec. 19, 2002

Related U.S. Application Data

(62) Division of application No. 09/500,889, filed on Feb. 9, 2000, now Pat. No. 6,403,165.

(51) Int. Cl.$^7$ .............................. B32B 15/04; F03B 3/12
(52) U.S. Cl. ...................... 428/632; 428/650; 428/680; 428/612; 428/469; 428/697; 428/699; 428/701; 428/702; 416/241 R
(58) Field of Search ................. 428/632, 687, 428/469, 701, 702, 699, 697, 650, 680, 612; 416/241 R, 241 B

(56) References Cited

U.S. PATENT DOCUMENTS

| 4,514,469 | A | | 4/1985 | Loersche et al. |
| 5,975,852 | A | | 11/1999 | Nagaraj et al. |
| 6,060,177 | A | | 5/2000 | Bornstein et al. |
| 6,136,453 | A | * | 10/2000 | Ritter et al. |
| 6,153,313 | A | * | 11/2000 | Rigney et al. |

* cited by examiner

Primary Examiner—Deborah Jones
Assistant Examiner—Jennifer McNeil
(74) Attorney, Agent, or Firm—Carmen Santa Maria; Kurt L. Ehresman; McNees Wallace & Nurick LLC

(57) ABSTRACT

A method for producing a turbine airfoil that is coated with a beta phase, high aluminum content coating, such as substantially stoichiometric NiAl, and which has a surface finish suitable for application of a ceramic topcoat. The method involves impacting the coating with preselected particles of a preselected size so that the brittle coating is not adversely affected by chipping or breakage. The impacting produces a surface finish of 120 micro-inches or better so that a ceramic thermal barrier layer can be applied over the coating. The preferred method of improving the surface finish utilizes steel balls having a diameter of about 0.033" and a peening intensity of no greater than about 6A.

20 Claims, No Drawings

TURBINE AIRFOILS HAVING MODIFYING STOICHIOMETRIC NIAL COATINGS APPLIED BY THERMAL PROCESSES

This application is a divisional of Ser. No. 09/500,889, now U.S. Pat. No. 6,403,165 filed on Feb. 9, 2000 and claims benefit thereto.

BACKGROUND OF THE INVENTION

This invention is directed to a method for modifying a brittle environmental or bond coating applied to turbine airfoils by a thermal spray process, and specifically to a stoichiometric NiAl coating having key quality characteristics required to protect the underlying turbine airfoil in a high temperature, oxidative and corrosive atmosphere while permitting application of long life thermal barrier topcoats.

Many systems and improvements to these systems have been set forth in the prior art for providing protection to turbine airfoils used in the hot section of a gas turbine from the combined effects of high temperatures, an oxidizing environment and hot corrosive gases. These improvements include new formulations for the materials used in the airfoils and include exotic and expensive nickel-based superalloys. Other solutions have included application of coating systems. These coating systems include environmental coating systems and thermal barrier coating systems. The environmental coating systems include nickel aluminides, platinum aluminides and combinations thereof. A multitude of improvements in these coatings and in methods of applying these coatings has been set forth that increase the life of the system, and developments in these improvements continue. In certain systems, thermal barrier coatings (TBC's) in the form of a ceramic are applied over the environmental coatings. In other systems, a bond coat such as a MCrAlX where M is an element selected from Ni, Co, Fe or combinations of these elements are applied as an intermediary between the airfoil and the applied ceramic. The bond coat desirably also is employed to improve the environmental performance of the system. These aluminides and MCrAlX alloys are substantially non-brittle alloys, being comprised substantially of gamma or gamma+gamma prime phases, although small amounts of higher Al content beta-phases may be present, particularly in the aluminides.

Although many of the solutions presented by the use of the nickel aluminides do provide improvements to the performance of the applied environmental coatings, one of the problems is that NiAl is a substantially stoichiometric composition, even when additions of rare earth material are made on a substitutional basis. These substantially stoichiometric compositions have increased Al content and exhibit outstanding oxidation resistance and act as stable bond coats that improve the system's resistance to spallation of applied thermal barrier topcoats. However, substantially stoichiometric NiAl is an extremely brittle material at ambient temperatures, with very low tensile ductility.

Although the prior art methods for application of the nickel aluminides did not always achieve a uniform stoichiometric coating of NiAl on a substrate because of concerns with brittleness, these methods can be used to achieve a substantially stoichiometric composition. These processes and methods include thermal spray techniques including but not limited to low pressure plasma spray (LPPS), high velocity oxy-fuel (HVOF) and detonation gun (D-gun), that thermally spray a powder of a predetermined composition.

Another frequently used method is to apply a coating by placing the substrate in an elevated temperature atmosphere that has a high concentration of a preselected element or elements in a gaseous phase. Typically, the preselected elements include at least aluminum. These methods include vapor phase aluminiding (VPA) and CVD methods. The aluminide coating is formed as the preselected element or elements are incorporated into the substrate and then diffuse into near surface regions, combining with elements already present in the substrate, such as nickel.

A third method of applying the coating that is frequently used includes electroplating. Here the substrate is placed in an electrolytic bath that includes metallic ions, typically Ni or Pt, but also Al. A thin coating of the ions is applied to the substrate by passage of an electrical current through the substrate. The aluminide is then formed by exposing the plated substrate to Al by one of the above methods.

The inherent problem with all of these methods is that when a substantially uniform stoichiometric composition of coating across the surface of the substrate is achieved, very little can be done to modify the surface of the coated substrate due to the brittle nature of the substantially stoichiometric NiAl intermetallic. Thus, certain key quality characteristics may not be readily achievable by these prior art methods. These include the correct degree of coating density and the proper surface roughness as the brittle nature of the intermetallic NiAl precludes mechanical working the coated substrate in the same manner as has been done with nonstoichiometric compositions of NiAl or PtAl.

What is needed are cost effective method that can be employed to modify surface roughness and, if possible, density, of a substantially stoichiometric composition of NiAl over the surface of a substrate such as a turbine airfoil without adversely affecting the brittle substrate. The method used to modify the surface of the stoichiometric composition of the coated substrate should control the final surface roughness of the coated article, and preferably if possible, the density of the applied coating by desirably acting on the substrate at or close to ambient temperatures without causing the brittle NiAl coating to be damaged.

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines. Blade technology including the composition and manner in which coatings are applied can improve blade life and performance. Currently, most as-manufactured NiAl coatings are neither sufficiently smooth nor sufficiently dense to achieve the full benefits of the NiAl coating. One method of applying a nickel aluminide coating is by a thermal spray process, such as the high velocity oxy-fuel (HVOF) process. Spray processes such as HVOF produce a surface roughness typically in the range of 100–240 microinches, with a common roughness of 180±30 microinches. If the surface formed by the HVOF spray is not stoichiometric, for example, if it is rich in Ni, then stoichiometry can be achieved by exposing the surface to an atmosphere rich in Al followed by a suitable heat treatment. However, these subsequent heat treatments will not affect the surface finish formed by the HVOF process. A smoother surface is desired as it will allow for better adhesion of a ceramic TBC, while a denser coating will improve the corrosion and oxidation performance of the coating over the operational life cycle of the part. In order to achieve the required surface finish and a desired density, the coated article is worked by one or a combination of controlled mechanical techniques that include impinging the surface of the article with particles of preselected size for a preselected time and intensity to provide a smoother surface finish and hopefully improved density of the parts without adversely affecting the brittle coating material. While the mechanical techniques have been used for other applications, they have not been used to improve the surface finish of stoichiometric NiAl coatings applied to turbine airfoils. In order to apply these techniques to brittle stoichiometric NiAl, certain process controls are required to prevent damage to the coating. The present invention utilizes steel balls of preselected size to peen the surface of the airfoil to achieve the desired surface finish of at least 120 micro-inches. Desirably, the peening also densifies the coating.

And while the present invention was developed for use with stoichiometric NiAl which is brittle, it may be used advantageously with any other coating with an unacceptably rough surface finish due to application techniques and that is inherently brittle, but which requires a smooth surface finish for proper performance. Typically, these coatings have a higher Al content than other, more ductile coatings and are identified as beta phases, and the coatings contain a substantial amount of the beta phases or are primarily beta phases.

An advantage of the present invention is the ability to tailor the surface roughness of a brittle, substantially stoichiometric NiAl coating. In this way, the inherent advantages of a substantially stoichiometric NiAl composition can be utilized, while the brittle nature of the stoichiometric composition can be overcome so that the surface finish of the article can be modified to achieve the same results currently achievable with non-stoichiometric compositions that are either low in Ni or low in Al.

Another advantage of the present invention is the ability to increase the density of the brittle coating without damaging it. Thus, the present invention can modify the as-sprayed coating to achieve the required surface finish and desired density in order to take advantage of the improved corrosion and oxidation capabilities of the smoother, denser coating without damaging the brittle coating. The airfoils that have had their surface finish modified in accordance with the present invention have a more aerodynamic gas flow path that serves to improve efficiency. Additionally, the furnace cycle testing (FCT) performance improves as the surface finish is improved, which is an indication of improved thermal performance, or alternatively, resistance to spalling.

Still another advantage of the methods of the present invention is that they can be applied to both new airfoils and to airfoils that have undergone repair. These methods provide a simple, effective technique for achieving substantially stoichiometric NiAl coatings that is cost effective and that can provide an adequate substitute for coatings that have a PtAl component.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention can be used on any turbine airfoil coated with a brittle coating, such as a substantially stoichiometric NiAl coating, by a thermal process that results in a rough surface finish having a desired density and surface finish. The turbine airfoils typically requiring such protection are the high pressure turbine blades and high pressure blades found aft of the combustor portion of a turbine engine. While any substantially stoichiometric NiAl coating may be applied, it is preferred to use a composition that include small additions of rare earth elements which include cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) as well as certain other elements such as Group IVa and VIa elements, including but not united to zirconium (Zr) and chromium (Cr). These additions, when provided on a substitutional basis, are known to produce a coating having improved oxidation resistance as well as resistance to spallation of the thermal barrier coating.

The NiAl may be applied by any method that can produce a substantially stoichiometric NiAl composition. As used herein, a substantially stoichiometric NiAl composition means an alloy that has a substantially ordered intermetallic structure of nickel and aluminum atoms, although certain of the alloy additions discussed above may be included on a substitutional basis for atoms in the ordered matrix and includes Al from about 37–76 at. % (atomic percent) or about 38–53 wt. %. As noted above, elements may be added on a substitutional basis. Preferred methods include exposing the substrate to a powder having a composition identical to or very close to the final desired composition. These include thermal spray techniques and in particularly, low pressure plasma spray (LPPS) and high velocity oxy-spray (HVOF).

The thermal spray techniques typically produce a rough surface finish. However, the NiAl intermetallic is a brittle coating, and in order to achieve a desired surface finish of 120 microinches and finer, it is necessary to modify the coating to achieve optimal performance of the coating. A surface finish of 120 micro-inches is necessary so that a tightly bound ceramic TBC can be applied over the environmental coating. If the surface finish is above the desired range, the life of the TBC is reduces as there is an increased tendency for the TBC to spall, thereby reducing the operating life of the component. The density is also important, but is more difficult to quantify. A less dense coating is not as effective in protecting the blade from the corrosive and oxidative effects of the hot gases of combustion to which it is subjected. Not only is corrosion and oxidation increased, but as the coating deteriorates locally, spalling of any applied TBC also increases in those affected areas. It is believed that as the coating is made smoother by the mechanical processing of the present invention, the coating is simultaneously made denser. Preferably, the surface can be modified to achieve a finish of 80 micro-inches and finer. Most preferably, the surface finish is 60 micro-inches and finer.

The importance of the relationship between surface finish and spalling was established by testing 32 samples of a superalloy to which stoichiometric or near-stoichiometric NiAl had been applied by thermal spraying. A thermal barrier coating (TBC) of yttria-stabilized zirconia was applied over the NiAl to a thickness of about 0.005 inches. The NiAl coating on half the samples was prepared for TBC application by first grinding the NiAl surface on 400 grit grinding paper, followed by grit blasting The surface finish on these samples was about 49 micro-inches prior to application of the TBC. The other half of the samples were grit blasted prior to application of the TBC and had a surface roughness of about 118 micro-inches prior to application of the TBC.

All of the samples were then given a furnace cycle test (FCT) which cycles the samples to temperature, 1850–2050° F. for one hour and back to black heat. Testing was continued on a sample until at least about 20% of the applied TBC had spalled from the surface of the sample. The average life of the samples having the smoother surface finish was about 447 cycles; the average life of the samples having the rougher surface was about 277 cycles. Thus, the smoother surface finish resulted in a substantial increase in the life of these samples.

Several effective methods for improving the surface finish of the coating by reducing the surface roughness which do not adversely impact the brittle stoichiometric NiAl coating were utilized. These methods can be used individually or may be used in combination to obtain the desired results. The methods include grit blasting, shot peening and tumbling. Grit blasting includes vapor honing and wet grit blasting, as the particles are mixed with different carriers, the carriers being compressed air, water vapor or water respectively. Each of these methods were applied to test samples of coatings applied by LPPS and HVOF, except for tumbling which was only utilized on a test sample prepared by HVOF. The surface finishes of the parts as processed after thermal spraying (before) and after processing by each of these methods are set forth in Table I. The results listed in Table I provided a substantial decrease in surface roughness, and additional processing will yield a surface finish suitable for application of a ceramic TBC.

TABLE I

REDUCTIONS IN SURFACE ROUGHNESS

| | | HVOF | LPPS |
|---|---|---|---|
| WET GRIT BLASTING | BEFORE | 209 | 180 |
| | AFTER | 149 | 128 |
| SHOT PEEN | BEFORE | 209 | 180 |
| | AFTER | 156 | 139 |
| TUMBLE | BEFORE | 175 | |
| | AFTER | 135 | |

The coated article may be processed by impinging particles of a preselected size to contact the article with a preselected force. Some exemplary methods include wet grit blasting, which is a process in which the coating is smoothed by exposing the surface of the article to an elevated velocity of particles in water. Another example includes shot peening using steel media to improve the surface finish and increases the density of the coatings. Still another process is tumbling, in which the applied coating can also be smoothed by tumbling the part through ceramic media such as alumina or silica.

In each of the grit blasting processes, the particles used are alumina and zirconia. Both the article sizes and the pressures used to impinge the particles on the surface must be carefully controlled to prevent chipping of the brittle surface. The grit sizes must be smaller than 60 mesh, preferably smaller than 220 mesh and most preferably 600 mesh. As noted above, for dry grit blasting, the media is carried by compressed air; for vapor honing the media is carried by water vapor; and for wet grit blasting the media is carried by water. For each of these processes, the peening intensity is controlled by pressure, which must be maintained below a maximum pressure of 80 psi, preferably below about 60 psi and most preferably at about 40 psi. The results of wet grit blasting are provided in Table I Airfoils and test buttons were thermally sprayed with a substantially stoichiometric NiAl coating using LPPS and HVOF. The articles were then shot peened using 330H steel shot having an average diameter of 0.033". Steel shot was selected over glass shot as glass shot has a tendency to shatter. The airfoils that coated have small cooling holes in intricate patterns. These cooling holes must be kept free of obstructions; therefore glass shot, which has a tendency to shatter, and smaller sized steel shot could enter and obstruct the passages. Other types of shot, such as cast shot, and not as readily classifiable and are more irregularly shaped so that they have a greater tendency to lodge in the cooling holes. The airfoils and test buttons were peened at a peening intensity of 8A, 6A and 3.3A. Peening intensity is measured by peening a strip of Almen material, either A-type or N-type, for a sufficient length of time to achieve 100% coverage of the surface. The amount of material deflection is measured in mils and the measure of the deflection is the peening intensity. Thus, if an A-type Almen strip is used, and deflection is measured to be 6 mils, then a 6A peening intensity is achieved. The A scale is the less severe peening scale.

For the airfoils and test buttons peened using the 330H steel balls, a 8A peening intensity resulted in coating chipping off at the trailing edge of the airfoils and at the cooling holes. At 6A peening intensity, there was no chipping and the results of the peening are provided in Table I. At 3.3A peening intensity, the results produced a satisfactory surface finish, but the amount of time to obtain 100% coverage of the surface was very long and the intensity was difficult to maintain, as the bans were traveling at such a reduced velocity that they barely reached the surface of the article. The preferred 6A peening intensity using the 330H steel balls is an unusual combination and is a very low intensity for shot of this size.

The surface roughness of the brittle coating on the airfoils may also be improved by tumbling. Tumbling is a process whereby particles of abrasive material in preselected forms, such as cubes, spheres and diamonds are placed into a closed vessel with the article and a fluid, usually water to aid in lubrication. The vessel is rotated so that the article and the media are agitated to move the media over and into contact with the part. The contact of the media with the surface of the article abrades the article surface, reduces asperities and smooths the surface. For the brittle coatings envisioned by the present invention, the tumbling must be done gently to avoid chipping. The results of tumbling for 10 minutes using an alumina media are listed in Table I. The alumina media is selected to be of a size sufficient to prevent the media from entering the cooling holes of the turbine airfoils. Thus, a minimum size of the particles was about 0.030". Tumbling for longer than 10 minutes produced chipping of the coating at the cooling holes. Thus, the preferred time for tumbling is about 10 minutes, with a maximum permissible time of 20 minutes. While alumina was used, other media that can be used include zirconia and plastic.

While the present invention has been described in terms of stoichiometric nickel aluminide coating applied to turbine blades as an environmental or bond coating, it will be understood that the invention can be used for any other brittle coating. This may permit the use of coatings that previously may not have been considered because of the inability to obtain the necessary surface finish for application of a ceramic TBC. One example is the MCrAlX bond coats where M is an element selected from the group consisting of Ni, Fe, Co or combinations thereof and X is usually yttrium. This alloy is in common use as a bond coat, but the chemical composition is such that it is used as a gamma prime coating. MCrAlX bond coats typically are either gamma/gamma prime hardenable or are simply non-hardenable gamma phase, including only about 8–10 weight percent aluminum (about 20 atomic percent Al and lower) and X is at least one element selected from the group consisting of Y, Zr, Hf, La, Sc, Ti, Si, and Re. The presence of a substantial amount of Cr added for corrosion protection also stabilizes the gamma phase. However, the beta phase is usually avoided because of its brittle nature. The present invention can be used to reduce the surface roughness, such as is typically formed by thermal spraying or plasma deposition, of a substantially beta phase MCrAlX having higher amounts of Al, from about 20–60 atomic percent, and lower amounts of Cr, from 0 to about 20 atomic percent than a gamma or gamma/gamma prime phase MCrAlX.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A turbine airfoil manufactured by the process comprising the steps of:
   providing a superalloy turbine airfoil;
   coating the turbine airfoil with a brittle band coat using a thermal spray process having a predetermined surface roughness;
   impinging the coated airfoil with particles of preselected size at a preselected intensity to densify the applied coating and provide a surface roughness of 120 micro inches and smoother without adversely affecting the coating; and then
   applying a ceramic thermal barrier coating over the densified coating.

2. The airfoil of claim 1 wherein the coating applied to the airfoil is a beta NiAl coating having a composition of Al in atomic percent of about 37% to about 73%, and the balance Ni and incidental impurities, the NiAl coating forming as substantially ordered intermetallic structure farther including elements added to the ordered intermetallic structure on a substitutional basis selected from the group consisting of Ce, Pr, Nd, Pm, Sm, Eu, Gd, Tb, Dy, Ho, Er, Tm, Yb, Lu in amounts that do not affect the ordered intermetallic structure.

3. The airfoil of claim 2 wherein step of impinging is selected from the group consisting of tumbling and shot peening.

4. The airfoil of claim 3 wherein the particles impinging the coated surface of the airfoil are steel balls of a preselected size.

5. The airfoil of claim 4 wherein the particles impinging the coated surface of the airfoil are steel balls having a size of about 0.033".

6. The airfoil of claim 4 wherein the steel balls impinging the coated surface have a preselected peening intensity of no greater than 6A.

7. The airfoil of claim 6 wherein the airfoil is peened at an intensity of no greater than about 6A for a time to densify the coating and to improve the surface finish of the as-sprayed bond coat at least about 22%.

8. The airfoil of claim 7 wherein the surface of the airfoil is tumbled using an abrasive media mixed with a lubricant for a time no greater than 20 minutes.

9. The airfoil of claim 6 wherein the airfoil is coated by a thermal spray process is selected from the group consisting of HVOF and LPPS.

10. The airfoil of claim 9 wherein the substantially beta (β) phase MCrAlX includes about 20 atomic percent to about 60 atomic percent aluminum.

11. The airfoil of claim 9 wherein the substantially beta (β) phase MCrAlX includes from about 0 to about 20 atomic percent chromium.

12. The airfoil of claim 6 wherein the airfoil is coated by application of the brittle bond coat directly ova the superalloy turbine airfoil wherein the brittle bond coat includes a substantially beta (β) phase MCrAlX, where M includes at least one element selected from the group consisting of Ni, Fe and Co and X includes at least one element selected from the group consisting of Y, Zr, Hf, La, Sc, Ti, Si and Re.

13. The airfoil of claim 6 wherein the airfoil is coated by application of the brittle bond coat directly over the superalloy turbine airfoil wherein the brittle bond coat includes a substantially beta (β) phase NiAl.

14. A turbine airfoil having a densified bond coating manufactured by the process comprising the steps of:
   providing a superalloy turbine airfoil;
   coating the turbine airfoil with a brittle bond coat using a thermal spray process having a surface roughness in the range of 100–240 micro inches;
   peening the coated airfoil with particles of preselected size at a preselected intensity to densify the applied coating and provide an improved surface roughness without adversely affecting the coating;
   impinging the coated airfoil with particles of preselected size for a time sufficient to provide the coating with a surface roughness of 120 micro inches and smoother; then
   applying a ceramic thermal barrier coating over the densified coating.

15. The airfoil of claim 14 wherein the substantially beta (β) phase NiAl has a composition Al in atomic percent of about 37% to about 73%, and the balance Ni and incidental impurities, the NiAl coating forming as substantially ordered intermetallic structure further including elements added to the ordered intermetallic structure on a substitutional basis selected from the group consisting of Ce, Pr, Nd, Pm, Sm, Eu, Gd, Tb, Dy, Ho, Er, Tm, Yb, Lu in amounts that do not affect the ordered intermetallic structure.

16. The airfoil of claim 14 wherein the airfoil is peened at a preselected peening intensity of no greater than 6A.

17. The airfoil of claim 15 wherein the airfoil is peened with steel balls having a size of about 0.033".

18. The airfoil of claim 17 wherein the surface of the airfoil is mechanically worked to produce a surface finish of 120 micro inches and smoother by a process selected by the group consisting of tumbling and grit blasting.

19. The airfoil of claim 17 wherein the airfoil is impinged by grit blasting at a pressure of 80 psi and below to achieve a surface finish of about 80 micro inches and smoother.

20. A high pressure turbine airfoil having a densified bond coating manufactured by the process comprising the steps of:
   providing a superalloy turbine airfoil;
   coating the turbine airfoil with a NiAl coat to a thickness of about 0.005" using a thermal spray process having a surface roughness in the range of 100–240 micro inches;
   grinding the surface to improve the surface finish of the applied coat using 400 grit grinding paper; and then
   impinging the coated airfoil with particles of preselected size for a time sufficient to provide the coating with a surface roughness of about 49 micro inches and smoother.

* * * * *

UNITED STATES PATENT AND TRADEMARK OFFICE
CERTIFICATE OF CORRECTION

PATENT NO. : 6,667,114 B2
DATED : December 23, 2003
INVENTOR(S) : Richard J. Grylls and Yuk-Chiu Lau It is certified that error appears in the above-identified patent and that said Letters Patent is hereby corrected as shown below:

Column 2,
Line 28, "method" should be -- methods --.

Column 4,
Line 13, "united" should be -- limited --.

Column 7,
Line 26, "band" should be -- bond --.
Line 40, "farther" should be -- further --.
Line 66, "process is selected" should be -- process selected --.

Column 8,
Line 5, "ova" should be -- over --.
Line 38, "Yb, Lu" should be -- Yb, and Lu --.

Signed and Sealed this

Twenty-eighth Day of March, 2006

JON W. DUDAS
*Director of the United States Patent and Trademark Office*